(12) United States Patent
Jinzenji et al.

(10) Patent No.: US 7,505,875 B2
(45) Date of Patent: Mar. 17, 2009

(54) MONITOR SYSTEM, AND MONITOR DEVICE AND DATA COLLECTING DEVICE THEREFOR

(75) Inventors: Tadamitsu Jinzenji, Kawasaki (JP); Masaaki Fujii, Mishima (JP); Yoshihide Nishiyama, Yokohama (JP)

(73) Assignee: OMRON Corporation, Kyoto (JP)

( * ) Notice: Subject to any disclaimer, the term of this patent is extended or adjusted under 35 U.S.C. 154(b) by 145 days.

(21) Appl. No.: 11/706,562

(22) Filed: Feb. 13, 2007

(65) Prior Publication Data

US 2007/0203676 A1 Aug. 30, 2007

(30) Foreign Application Priority Data

Feb. 14, 2006 (JP) ............................ P2006-037259
Feb. 14, 2006 (JP) ............................ P2006-037293

(51) Int. Cl.
*G06F 11/00* (2006.01)
(52) U.S. Cl. ..................... 702/188; 340/521; 340/522; 345/440; 702/189
(58) Field of Classification Search ................ 702/179, 702/182, 185, 187–189; 345/440; 340/521, 340/522; 700/273
See application file for complete search history.

(56) References Cited

U.S. PATENT DOCUMENTS 5,061,916 A * 10/1991 French et al. ............... 340/522
7,230,625 B2 * 6/2007 Brooks et al. ............... 345/440
7,389,204 B2 * 6/2008 Eryurek et al. .............. 702/188
2003/0164762 A1 * 9/2003 Ridley ........................ 340/521

FOREIGN PATENT DOCUMENTS

JP 2003-021650 1/2003
JP 2005-128721 5/2005

* cited by examiner

*Primary Examiner*—John H Le
(74) *Attorney, Agent, or Firm*—Weaver Austin Villeneuv & Sampson LLP

(57) ABSTRACT

A monitor system is formed with a programmable controller for executing a user program, a data collecting unit connected to the programmable controller for collecting variable data of the programmable controller and a monitor device connected to the data collecting unit through a communication line. The functions of the system include that of storing a preliminarily defined virtual variable apart from the user program of the programmable controller and from the variable data of the programmable controller and a calculation formula using one or more real variables for obtaining the virtual variable, that of collecting real variable data in the stored calculation formula and any other real variables from the programmable controller, that of carrying out a calculation according to the stored calculation formula based on the collected real variable data, and that of displaying correspondence of the collected real variables and the result of the calculation as waveforms on a display device. Some of these functions are carried out by the data collecting unit, the rest being carried out by the monitor device.

5 Claims, 13 Drawing Sheets

| NAME | ADDRESS | DATA TYPE | NUMBER OF ELEMENTS | SCALE CONVERSION | INDUSTRIAL UNIT | DATA COLLECTION PATTERN | EXPLANATION |
|---|---|---|---|---|---|---|---|
| Line emergency stop switch | 0100.00 | BOOL | 1 | | | Basic, data | Line emergency stop switch |
| Line operation | 0100.15 | BOOL | 1 | | | Basic, data | Line operation |
| Start carrying in pre-work substrate | 0101.00 | BOOL | 1 | | | Basic, data | Start carrying in pre-work substrate |
| Substrate throw in signal | 0110.00 | BOOL | 1 | | | Basic, data | Substrate throw in signal |
| Soldering iron | 0111.00 | BOOL | 1 | | | Basic, data | Soldering iron |
| Planned soldering number done | 0110.05 | BOOL | 1 | | | Basic, data | Planned soldering number done |
| X-positioning done | 0110.02 | BOOL | 1 | | | Basic, data | X-positioning done |
| Y-positioning done | 0110.03 | BOOL | 1 | | | Basic, data | Y-positioning done |
| Carrying out done | 0110.15 | BOOL | 1 | | | Basic, data | Carrying out done |
| Conveyer speed out | D00020 | UINT_BCD | 1 | | | Basic, data | Conveyer speed out |
| Conveyer speed in | D00021 | UINT_BCD | 1 | | | Basic, data | Conveyer speed in |
| Current X-position | D00040 | UINT_BCD | 1 | | | Basic, data | Current X-position |
| Current Y-position | D00041 | UINT_BCD | 1 | | | Basic, data | Current Y-position |
| Number of products | D00024 | UINT_BCD | 1 | | | Basic, data | Number of products |
| Number of defects | D0200 | UINT_BCD | 1 | | | Basic, data | Number of defects |
| Number of OK objects | SPU/DM_0000 | UINT_BCD | 1 | | | Basic, data | Number of OK products |
| Ratio of OK objects | SPU/DM_0000 | UINT_BCD | 1 | | | Basic, data | Ratio of OK products |

Fig. 7

| NAME | DATA TYPE | FORMULA |
|---|---|---|
| Load time | REAL | Work time-Planned stop time-No-load time -Unmanaged time |
| Operating time | REAL | Load time-Cleanup time-Fault time-Exchange time-Adjust time-Startup time |
| Operating time rate | REAL | Operating time/Load time*100 |
| Net operating time | REAL | Product number*Theoretical cycle time |
| Functional operation rate | REAL | Net operating time/Operating time*100 |
| Number of OK objects | UNIT_BCD | Product number-Number of defects |
| Ratio of OK objects | REAL | Number of OK objects/Product number*100 |
| Overall equipment efficiency | REAL | Ratio of OK objects*Functional operation rate*operating time rate/10000 |

Fig. 8

MONITOR SYSTEM, AND MONITOR DEVICE AND DATA COLLECTING DEVICE THEREFOR

This application claims priority on Japanese Patent Applications 2006-037259 and 2006-037293 filed Feb. 14, 2006.

BACKGROUND OF THE INVENTION

This invention relates to devices for collecting a plurality of control data from a programmable controller memory by means of a data collecting unit connected to the programmable controller through a bus, outputting these collected data to a monitor device such as an image display, and causing these control data to be displayed sequentially in time and monitored by the monitor device.

A programmable controller (PLC) is formed by using a bus to connect a CPU unit for a control, a communication unit for communicating with the exterior and an I/O unit for connecting to sensors. The CPU unit contains a microprocessor and a user memory that stores user programs preliminarily created according to the details of the control. The I/O refresh process, the user program execution process and the peripheral service process are cyclically carried out by executing a specified system program. The time required for carrying out this cycle of processes is generally referred to as a cycle time. The I/O refresh process is for the CPU unit of the PLC to exchange control data such as IN data and OUT data through the bus communication with the I/O unit. The CPU unit includes memories (such as an input-output memory and a data memory) for storing control data such as IN data and OUT data. Data collecting units connectable to a PLC have been known, as disclosed in Japanese Patent Publication Tokkai 2005-128721, as an example of device for automatically and periodically collecting control data of all sorts stored in the memory of the CPU unit (inclusive of the aforementioned IN data and OUT data and more specifically the on-off data of input-output signals). Such a data collecting unit continues to collect data from the CPU unit at a specified frequency and stores a time-series of changes of control data. The data collecting unit is sometimes herein referred to as a signal processing unit (SPU) and is connected to the CPU unit through a bus. It has also been known, as disclosed in Japanese Patent Publication Tokkai 2003-21650, to monitor through a monitor device such as an image display device a series of control data collected by such a data collecting unit. As a series of such control data is stored, the on-off signals of an input-output signal varying as a time series (a time series of bit data array) can be grasped by a monitor device to be described below.

It is common for a monitor device of this kind to be provided with the function of receiving a series of control data collected from the CPU unit by the data collecting unit, converting each time series of changes of these data into a pulse array waveform, and displaying them over a plurality of lines on the display screen.

In order to be collected by a data collecting unit of this type, the data must be treated as control data or variable by the PLC. Moreover, they must be assigned to the I/O memory or the data memory contained in the CPU unit, and this is to say that the recording area of the memory must be uniquely determined. When it is desired to collect special data such as those obtained by a calculation between two variables by means of the data collecting unit, for example, it is necessary to set new variables and to correct the user program (such as a program created in a ladder diagram language) such that the PLC will carry out a calculation between the variables. The data collecting unit must also be set such that these news variables will be periodically collected from the assigned areas of the memory of the CPU unit of the PLC and that the monitor device will read out these data and display.

For example, although variables such as the number of produced objects and the number of defective objects are usually defined within the data memory of a PLC, if it is desired to separately obtain data such as the number of OK objects and the ratio of OK objects, variables must be newly defined corresponding to them and calculation formulas corresponding to these variables must be added by using a specified instruction language in the user program of the PLC. Specifically, the calculation formulas that may be written as "Number of OK objects"="Number of produced objects"–"Number of defective objects" and "Ratio of OK objects"=("Number of produced objects"–"Number of defective objects")/"Number of produced objects" must be added into the user program.

One generally hesitates to add or correct a user program after the PLC has already entered its operating cycle and is normally operating, although it may become desirable to monitor new data involving a calculation between variables. This is because the newly added calculation may cause an increase in the cycle time and even an unexpected operational error. As a result, it is common that the manner of using the monitoring device becomes limited after the PLC enters its operating stage.

It is therefore an object of this invention in view of the above to provide a monitor system capable of monitoring new data involving calculations between variables even after the PLC has entered an operating stage without adding or modifying the user program of the PLC.

Other objects of this invention will become clear from the descriptions of the specification that follows.

SUMMARY OF THE INVENTION

A monitor system according to this invention may be broadly characterized as comprising a programmable controller for executing a user program to carry out a control, a data collecting unit connected to the programmable controller either integrally or through a communication line for collecting variable data of the programmable controller, and a monitor device connected to the data collecting unit through a communication line, and more particularly as comprising memory means for storing a preliminarily defined virtual variable apart from the user program of the programmable controller and from the variable data of the programmable controller and a calculation formula using one or more real variables for obtaining the virtual variable, collecting means for collecting real variable data in the calculation formula stored in the memory means and any other real variables from the programmable controller, calculating means for carrying out a calculation according to the calculation formula stored in the memory means based on the real variable data collected by the collecting means and displaying means for displaying correspondence of the real variables collected by the collecting means and the result of the calculation by the calculating means as waveforms on a display device.

With a monitor system thus structured, it is possible to monitor desired data because virtual variable data obtained by calculation formulas preliminarily set on the side of the data collection unit or the side of the monitor device and real variable data collected from the programmable controller are displayed as waveforms on the image screen of an image display device on the side of the monitor device. Object data to be monitored can be expanded without causing a delay in the cycle time due to any additional user program since there is no need to add or change a ladder program on the side of the PLC even if new variables (virtual variables) are defined.

According to a first embodiment of this invention, the data collecting unit is comprised of the collecting means and the monitor device is comprised of the memory means, the calculating means and the displaying means. As a specific example of the first embodiment, the collecting means includes means for collecting data on the real variables from a memory of the programmable controller based on mapping data in synchronism with the cycle time of the programmable controller and means for transmitting the collected data on the real variables to the monitor device, the calculating means includes means for obtaining the data on the real variables from the collecting means and means for generating a data array of virtual variables by substituting the obtained data into the calculation formula stored in the memory means, and the displaying means displays the obtained data on the real variables from the collecting means as waveforms on the display device.

With a monitor system structured according to the first embodiment of the invention, virtual variable data based on preliminarily set calculation formulas can be obtained on the side of the monitor device and the real variable data collected from the programmable controller can be obtained from the data collecting unit. Desired data can be monitored by displaying these virtual and real variable data on the image screen on the side of the monitor device as waveforms. Object data to be monitored can be expanded without causing a delay in the cycle time due to any additional user program since there is no need to add or change a ladder program on the side of the PLC even if new variables (virtual variables) are defined.

According to a second embodiment of this invention, the data collecting unit is comprised of the memory means, the collecting means and the calculating means and the monitor device is comprised of the displaying means. As a specific example of the second embodiment, the memory means includes means for creating mapping data on real variables in a memory of the programmable controller based on real variables in the calculation formula stored in the memory means and the other real variables of the collecting means, the collecting means includes means for collecting data on the real variables from a memory of the programmable controller based on the mapping data in synchronism with the cycle time of the programmable controller, and the calculating means includes means for generating a data array of virtual variables by substituting the data obtained by the collecting means into the calculation formula stored in the memory means and means for transmitting the generated data array of the virtual variables to the monitor device.

With a monitor system structured according to the second embodiment of the invention, virtual variable data based on preliminarily set calculation formulas and the real variable data collected from the programmable controller can be obtained on the side of the data collecting unit. Desired data can be monitored by transmitting these obtained data to the side of the monitor device and displaying them on the image screen on the side of the monitor device as waveforms. Object data to be monitored can be expanded without causing a delay in the cycle time due to any additional user program since there is no need to add or change a ladder program on the side of the PLC even if new variables (virtual variables) are defined.

A monitor device according to this invention is intended to be a part of a monitor system embodying this invention as explained above, and is characterized as comprising the aforementioned memory means, calculating means and displaying means, the calculating means including means for obtaining the data on the real variables collected by the data collecting unit from the programmable controller and means for generating a data array of virtual variables by substituting the obtained data on the real variables into the calculation formula stored in the memory means, and the displaying means displaying time series of changes in data on real and imaginary variables from the data of the real variables collected by the data collection unit from the programmable controller and the virtual variables obtained by the calculating means as waveforms on the display device.

With a monitor device thus structured, virtual variable data obtained with a preliminarily set calculation formula can be obtained on the side of the monitor device of a monitor system and real variable data collected from the programmable controller of the monitor system can be obtained from the data collecting unit. Data on these virtual and real variables can be displayed as waveforms on an image screen on the side of the monitor device such that desired data can be monitored. Object data to be monitored can be expanded without causing a delay in the cycle time due to any additional user program since there is no need to add or change a ladder program on the side of the PLC even if new variables (virtual variables) are defined.

Such a monitor device may further comprise setting-registering means for setting and registering the virtual variables and the calculation formula stored in the memory means through a setting screen. As a particular example, such setting-registering means may be characterized as including virtual variable setting screen displaying means for displaying a virtual variable screen, having an input data display area having a display area for names of virtual variables, a display area for data types of virtual variables and a display area for calculation formulas for defining virtual variables, a variable list display area for displaying as a menu a list of variables that are selectable for setting virtual variables and an operating key display area which includes a key display area for displaying number keys, logical value keys, arithmetic operation keys and logical operation keys that are used for defining virtual variables and a confirmation key for confirming virtual variables, means for creating calculation formulas for virtual variables corresponding to user's operations including operations on the variable list display area for selecting variables and operations on said number keys, the logical value keys, the arithmetic operation keys, the logical operation keys and the confirmation key, and means for registering the created calculation formulas. With a monitor device thus structured, the setting and registering processes can be carried out more easily because the setting and registering of the virtual variables and the calculation formulas can be carried out interactionally on the image screen.

A data collecting unit of this invention is also intended to be a part of a monitor system embodying this invention as explained above, and is characterized as comprising the aforementioned memory means, collecting means and calculating means, the memory means including means for creating mapping data on real variables in a memory of the programmable controller based on real variables in the calculation formula stored in the memory means and the other real variable of the collecting means, the collecting means including means for collecting data on the real variables from a memory of the programmable controller based on the mapping data in synchronism with the cycle time of the programmable controller, and the calculating means including means for generating a data array of virtual variables by substituting the data obtained by the collecting means into the calculation formula stored in the memory means and means for transmitting the generated data array of the virtual variables to the monitor device.

With a data collecting unit thus structured according to this invention, virtual variable data based on preliminarily set calculation formulas and the real variable data collected from the programmable controller can be obtained on the side of the data collecting unit. Desired data can be monitored by transmitting these obtained data to the side of the monitor device and displaying them on the image screen on the side of the monitor device as waveforms. Object data to be monitored can be expanded without causing a delay in the cycle time due to any additional user program since there is no need to add or change a ladder program on the side of the PLC even if new variables (virtual variables) are defined.

BRIEF DESCRIPTION OF THE DRAWINGS

FIG. 7 is an image of a collection setting screen.

FIG. 8 is an image of a virtual variable list screen.

DETAILED DESCRIPTION OF THE INVENTION

Figure 1:
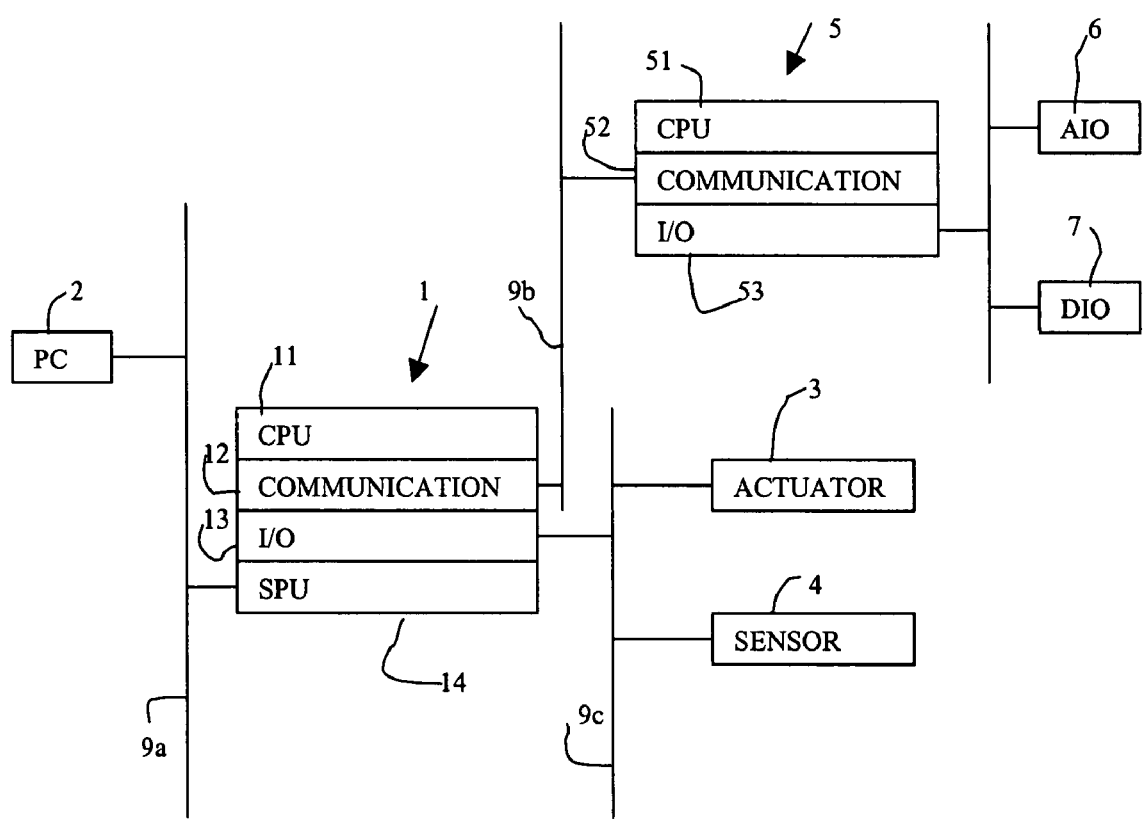
FIG. 1 shows an example of hardware structure of a PLC system including a data collecting unit.

The invention is described with reference to FIG. 1, which shows an example of hardware structure of a PLC system including a data collecting unit. As shown, this PLC system is comprised of a first PLC 1, a second PLC 5 and a personal computer (PC) 2 serving as its core. The first PLC 1 and the PC 2 are connected with communication line 9a, and the first PLC 1 and the second PLC 5 are connected with communication line 9b.

The first PLC 1 is structured as a so-called building block type, including a CPU unit 11 for a control, a communication unit 12 for communicating with the exterior, an I/O unit 13 for connecting to input or output apparatus and a data collecting unit (or a signal processing unit SPU) 14. These units are connected through a bus through a back plane board.

As well known by persons skilled in the art, the CPU unit 11 contains internally a microprocessor for carrying out an overall control, a user program memory that stores user programs, an I/O memory or a data memory (hereinafter I/O memory) for storing so-called I/O data. The internally contained microprocessor of the CPU unit 11 is adapted to cyclically execute the I/O refresh process, the user program execution process and the peripheral service process by executing a specified system program. The time required to carry out a cycle of these processes is referred to as the cycle time.

The I/O unit 13 is connected to a plurality of input and output apparatus (not shown) and is provided with a memory for storing data corresponding to each of these apparatus, serving to periodically accept input data (inclusive of bit variable data which are on-off data and analog variable data which are numerical data) from an external sensor 4 and to store them. It also serves to transmit output data (inclusive of the results of executed user program) transmitted by the IO refresh process by the CPU unit 11.

In the I/O refresh process by the CPU unit 11, the microprocessor writes in the input data from the I/O unit 13 at a corresponding area of the I/O memory through the bus. In the user program execution process by the CPU unit 11, the microprocessor executes sequentially the user instructions of the user program stored in the user program memory. The calculation is carried out by referencing the contents of the input data stored in the I/O memory by following the user instructions and the contents of the output data of the memory are rewritten based on the results of this execution.

In the peripheral service process by the CPU unit 11, I/O data are exchanged by carrying out communications with the second PLC 5 through the communication unit 12.

The data collecting unit 14 includes a processor. At the time of the I/O refresh process by the CPU unit 11 described above, this processor reads out all data of the I/O memory from the CPU unit 11 through the bus and accumulates and saves them in the memory in the data collecting unit (SPU) 14. Instead of reading out all data, however, target data to be read out may be preliminarily set such that only those specified data will be read out of the memory of the CPU unit 11. The collection of data may be carried out during the peripheral service process carried out instead of at the time of the I/O refresh process of the CPU unit 11. A specified processing period may be set before or after the period for the execution of the user program. In short, it is sufficient if the structure is such that data collection is carried out once per cycle of the operations by the CPU unit 11. Moreover, the cycle of data collection operations need not be in synchronism with the cyclic operation of the CPU unit 11. The data collection process may be carried out once per plurality of cycles of operations by the CPU 11.

The control data of the CPU unit 11 are thus collected by the data collecting unit 14 and accumulated and stored in the memory of the data collecting unit 14. These collected data are control data of the CPU unit 11 and include bit variables and analog variables, or input and out data. The data collecting unit 14 is provided with memory assignment data for the control data and variables on the side of the CPU unit 11. If information on memory areas of the CPU unit 11 storing target data to be collected is preliminarily set on the side of the data collecting unit, the data collecting unit 14 is enabled to periodically collect target data from the CPU unit 11. It is further preferable to register symbol data in the data collecting unit 14 in addition to the memory assignment data. Aforementioned "Number of produced objects" and "Number of defective objects" are examples of symbol data which are expressed as character arrays and are sometimes also referred to as tag data or comments (also equivalent to "comments" 133 in FIG. 9). The collected data are read out of the data collecting unit 14 and transmitted to the PC 2 as the PC 2 and the data collecting unit 14 communicate with each other at an appropriate timing.

The symbol data collected by the data collecting unit 14 and the memory assignment data of the CPU unit 11 are preliminarily registered in the PC 2. (The symbol data are used in the display of the comments 133 in FIG. 9 and the memory assignment data are used in the display of the address 132 in FIG. 9.) The PC 2 obtains these collected data from the data collecting unit 14 by communicating with the data collecting unit 14 at an appropriate timing. The symbol data and the memory assignment data need not necessarily be registered preliminarily. They may be adapted to be obtained by the PC 2 from the data collecting unit 14 through communication. The obtained data are stored in a variable table provided within the memory of the PC 2.

Thus, the PC 2 displays changes with time as waveforms of pulse arrays or analog waveforms corresponding to each of control data on the screen of an image display device based on these obtained data, as will be described more in detail with reference to FIG. 9. This makes it possible for the user to visually monitor the control data and various analog data handled by the PLC 1 through the image screen of the image display device. If it is so arranged that the first PLC 1 (or the CPU unit 11) carries out the peripheral service processes so as to obtain data from the second PLC 5 and that the data collecting unit 14 collects data from the second PLC 5 through the CPU unit 11, the PC 2 also becomes able to monitor the data of the second PLC 5.

According to this invention, it is not only that the contents of the I/O memory of the CPU unit 11 are directly displayed on a monitor, as explained above, but also new data obtained by carrying out an appropriate calculation process on them (hereinafter referred to as virtual variable data) are displayed on the screen of the image display device of the PC 2. This aspect of the invention will be explained below more in detail.

Figure 2:
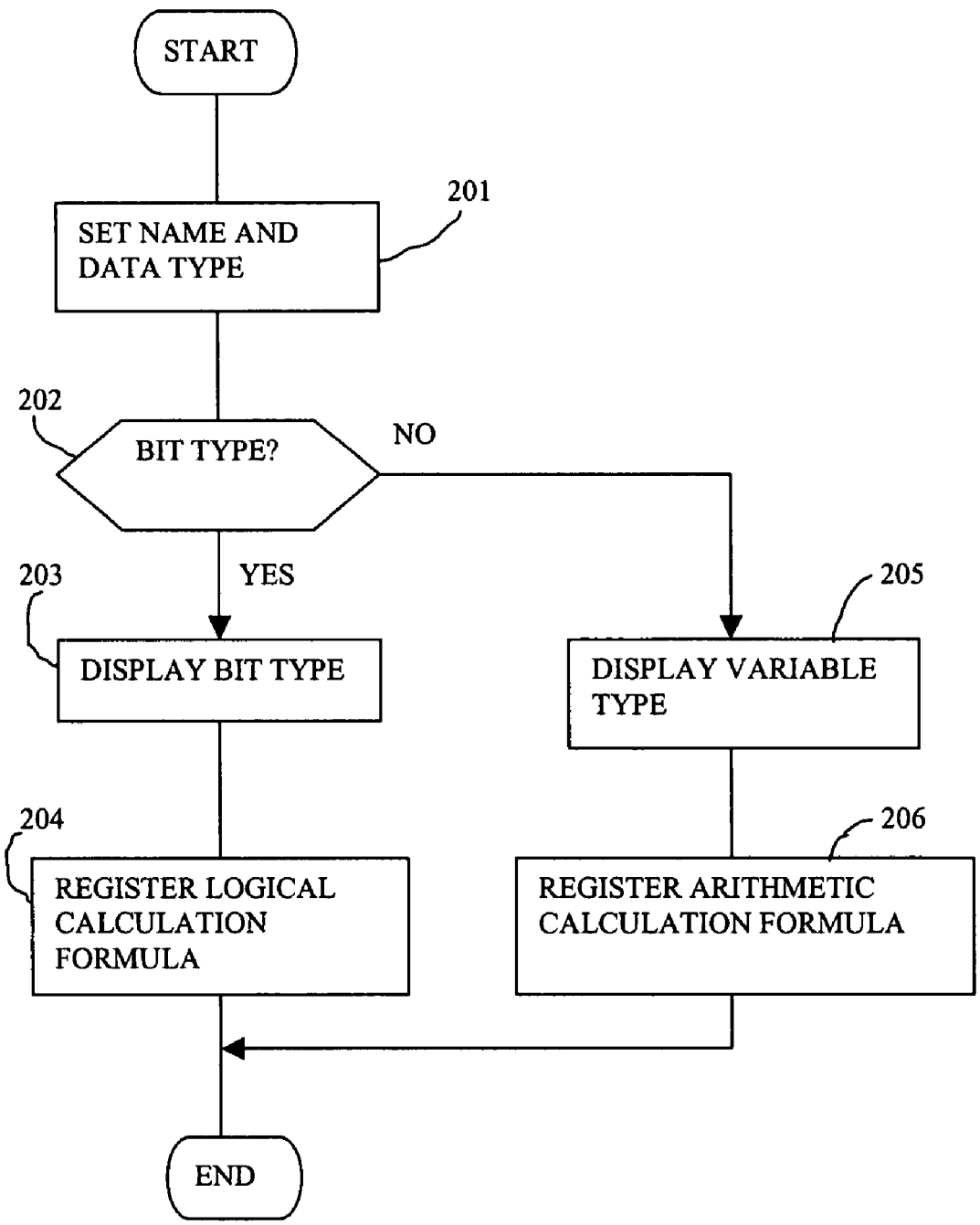
FIG. 2 is a flowchart of the virtual variable setting process.
Figure 6:
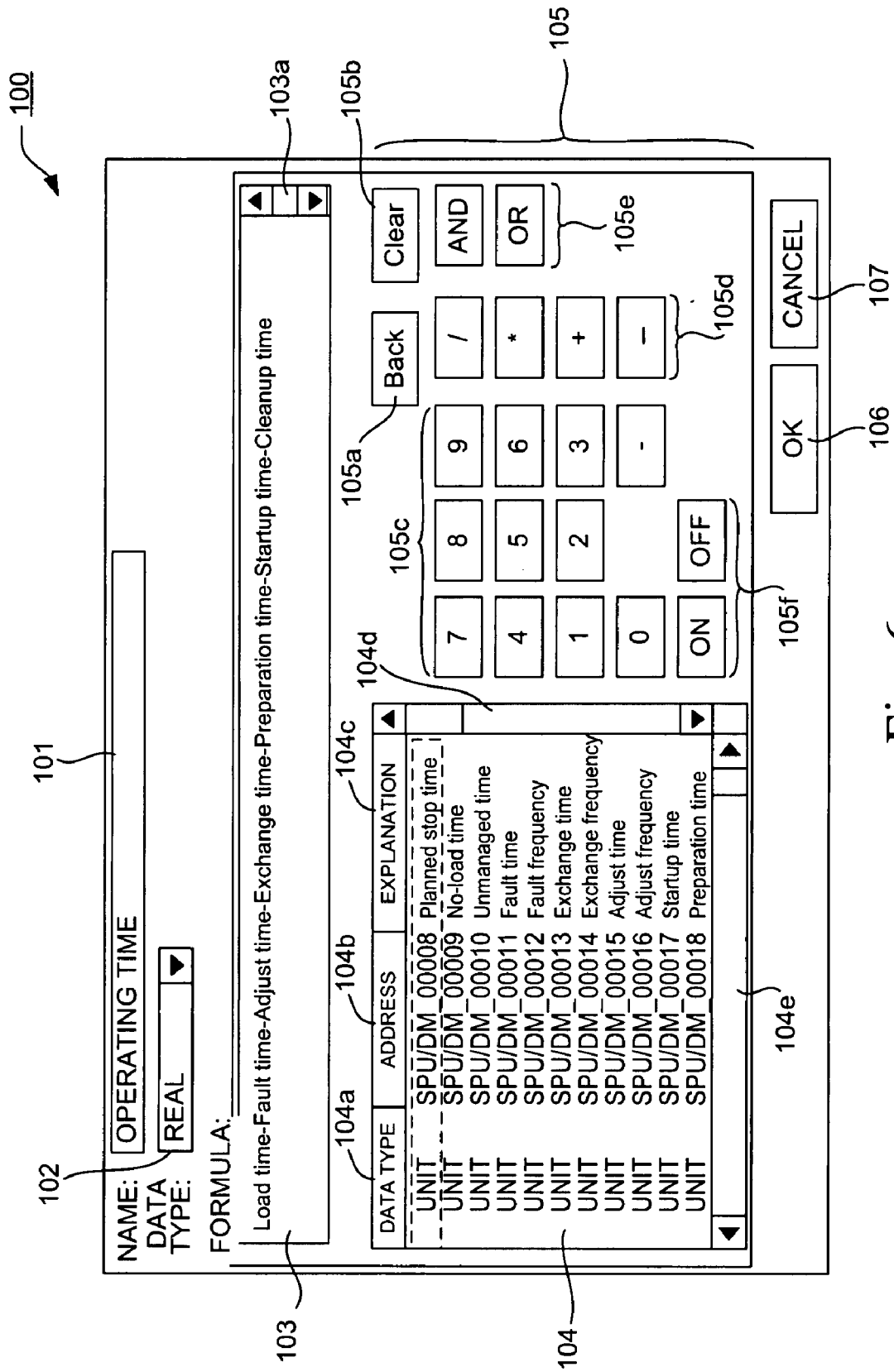
FIG. 6 is an image of a virtual variable setting screen.

FIG. 2 shows a flowchart of the setting process related to virtual variable data and FIG. 6 shows the image of virtual variable setting screen. As shown in the flowchart of FIG. 2, the setting process for virtual variables starts by setting the "name" and the "data type" of each virtual variable (Step 201). As shown in FIG. 6, this setting operation is carried out according to the virtual variable setting screen.

The virtual variable setting screen of FIG. 6 is displayed on the screen of the image display device of the PC 2. As shown, the PC 2 displays on this screen a name display area 101 for displaying the "names" of virtual variables, a data type display area 102 for displaying the "data types" of virtual variables, a formula display area 103 for defining "calculation formulas" for virtual variables, a variable list display area 104 for displaying as a menu control data usable for setting virtual variables and a list of virtual variables, key display area 105 for displaying operating keys of various kinds necessary for setting variable variables, an OK button 106 and a cancel button 107.

In the above, "names" are data for the user to recognize or specify what virtual variables represent and are character array data such as "Operating time" in the figure or "Number of OK objects" and "Ratio of OK objects" as described above. "Data types" are for defining the data format. For example, BOOL means a binary data item indicating whether it is 1 or 0 or whether it is on or off, and UINTBCD indicates an integer without sign. "Calculation formula" indicates the details of a calculation for obtaining information not obtainable directly from the obtained data. It may be a formula shown in the figure or the aforementioned formula "Number of produced objects"−"Number of defective objects" for obtaining "Number of OK objects" or ("Number of produced objects"−"Number of defective objects")/"Number of produced objects" for obtaining "Ratio of OK objects". "Names", "data types" and "formulas" are correlated as will be explained below with reference to FIG. 8.

The PC 2 displays in its variable list display area 104 various obtained data (hereinafter referred to as variables) as well as "data type," "address" and "explanation" (as character array for explaining the meaning and content of a variable or virtual variable). As will be described in detail below with reference to the flowchart of FIG. 2, the PC 2 displays an optimal menu in the variable list display area 104 according to the data type set by the user. The source of the variables (or the obtained data) are collected data on the side of the data collecting unit and the control data on the side of the CPU unit. The virtual variables are those created according to the flowchart shown in FIG. 2.

In the key display area 105, the PC 2 displays a back key 105a, a clear key 105b, number keys 105c, arithmetic operation keys 105d, logical operation keys 105e and logical value keys 105f.

Thus, the user will set virtual variables programmably while watching this virtual variable setting screen. The user will input the name of a corresponding virtual variable (such as "operating time") and its data type (such as "REAL") respectively into the name display area 101 and the data type display area 102 by using the word processor function of the PC 2. Thereafter, the PC 2 displays a cursor within the variable list display area 104 and invites the user to move it up and down. As the user selects a desired variable or virtual variable, and the various keys 105a-105f displayed in the key display area 105 are operated at the same time, a formula corresponding to the desired virtual variable. The PC 2 receives the result of these operation and displays the formula in the formula display area 103. The OK button 106 is then operated upon such that virtual variable "operating time" defined by the content of the formula display area 103 is stored in correlation with the name and the data type at a specified area within the memory.

If the operator sets the data type to be "bit type" (on-off signal) (YES in Step 202), the display in the variable list display area 104 is changed to the bit type (Step 203). Thereafter, the user selects data of the bit type from the variable list display area 104 and generates a desired formula by operating the logical operation keys 105e and the logical value keys 105f. The PC 2 receives the result of these operations and registers it in correlation with the name, the data type and the formula at a specified area of the memory within the PC 2 (Step 204).

If the user selects anything other than the bit type as the data type (NO in Step 202), "variable type" is displayed in the variable list display area 104 (Step 205). The user operates on the number keys 105c and the arithmetic operation keys 105d to create an arithmetic formula. The PC 2 receives the results of these operations and registers it in correlation with the name, the data type and the formula at a specified area of the memory within the PC 2 (Step 206).

Thus, the PC 2 sets virtual variables programmably through a conversational (interactional) screen. After the setting process is completed, the virtual variables and their formulas newly set at the specified areas in the memory of the PC 2 are stored together. As the monitor process is thereafter activated, these newly set virtual variables can be displayed by specifying for monitoring together with the changes of the variables which are collected data.

FIG. 8 shows the image of a list screen of virtual variables newly set by the process explained above with reference to FIGS. 2 and 6. As the user sets a specified display mode, the PC 2 displays a virtual variable list screen as shown on the image display device. The user can thus recognize the names, the data types and the formulas of the newly set virtual variables by observing this list screen. As for a stored virtual variable, it may be displayed at the variable list display area 104 when a different virtual variable is newly set thereafter and may be treated as a variable to be selected.

FIG. 7 shows an example of image of collection setting screen. As the user sets a specified mode, the PC 2 displays on the screen of the image display device a list of obtained data that can be displayed as shown. If it is desired to actually display only a part of this for monitoring, those to be monitored may be selected from this list. Not only the variables obtained by the PC 2 (of which the source is the collected data of the data collecting unit and the control data of the CPU unit as explained above) but also any virtual variable set through FIGS. 2 and 6 may be included in this collection setting screen. In the example of FIG. 7, "Number of OK objects" and "Ratio of OK objects" are virtual variables.

Figure 3:
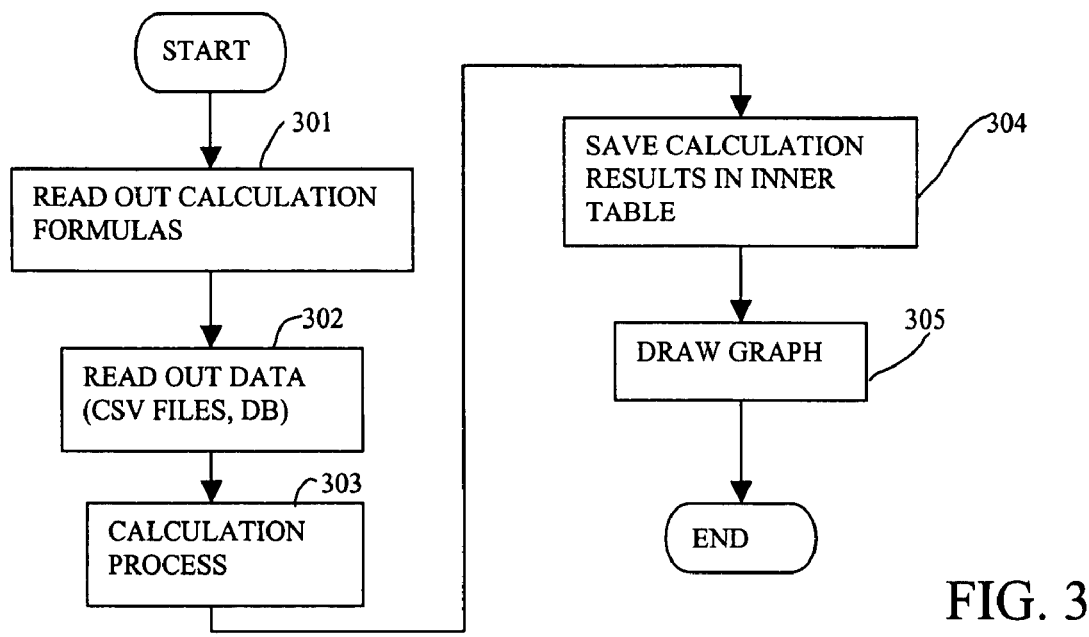
FIG. 3 is a general flowchart of the whole of the monitoring process.

The virtual variables thus set can be obtained as the formulas for obtaining them are automatically executed by the PC 2. Thus, the virtual variables can be handled as if they were newly obtained on the side of the PLC by using a ladder diagram language and transmitting them to the PC 2, Next, the monitoring process is explained by referencing FIG. 3 which shows a general flowchart for the whole of the monitoring process.

Figure 4:
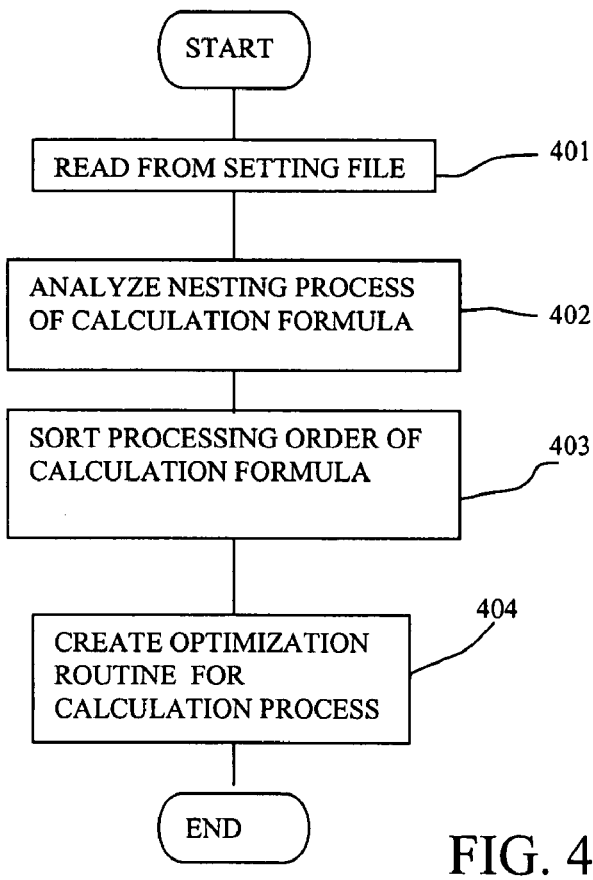
FIG. 4 is a detailed flowchart of the formula readout process.

As this process is started, a formula readout process is carried out first (Step 301). A detailed flowchart of the formula readout process is shown in FIG. 4. As shown, a virtual variable is firstly read out in this process from a setting file (including data shown in the collecting setting screen shown in FIG. 7 and the virtual variable list screen shown in FIG. 8) (Step 401).

Next, the PC 2 analyzes the nesting process of the formulas of the virtual variable and variables that have been read out (Step 402). In the above, each of the formulas corresponding to the virtual variables is stored in a formula table.

Figure 5:
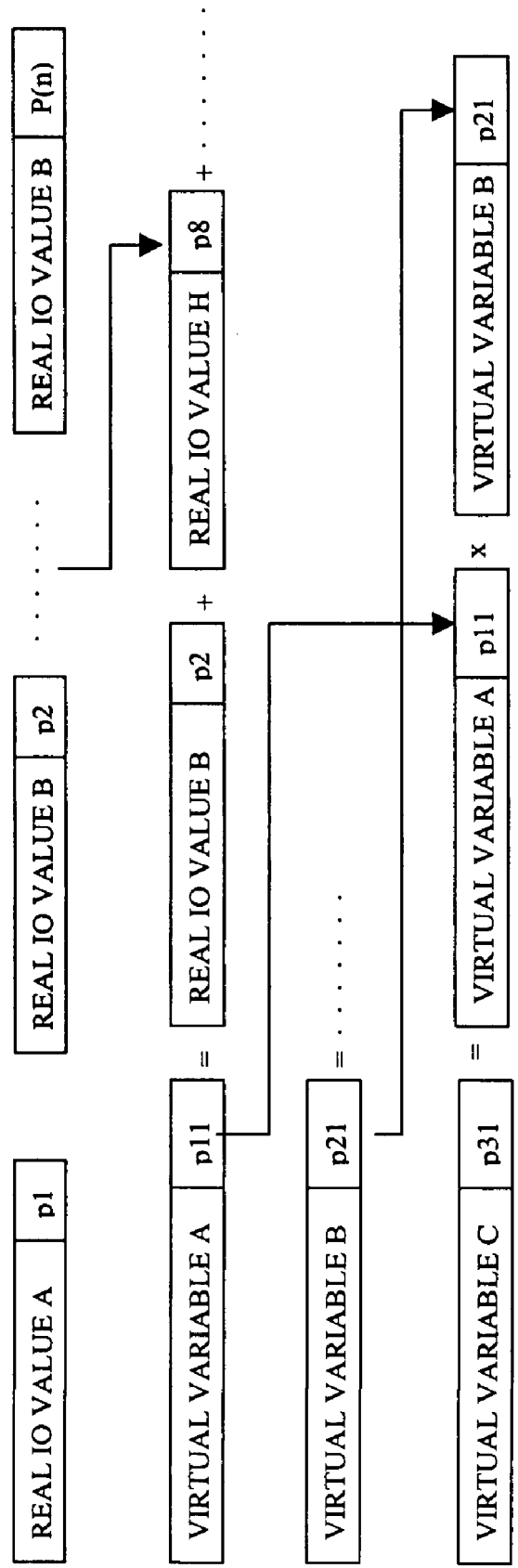
FIG. 5 is a structural diagram of a formula table.

As shown in FIG. 5, pointer P(n) is attached to each of the real IO values and virtual variables such that, for example, pointer for real IO value A is p1 and pointer for real 10 value B is p2. The virtual variables are represented by using the pointers showing these real IO values. For example, pointer p11 may be attached to virtual variable A and the formula for obtaining virtual variable A may be represented as an addition formula of pointer p2 showing real 10 value B and pointer p8 representing real IO value H. Similarly, pointer p31 may be attached to virtual variable C and the formula for obtaining virtual variable C may be represented as the product of pointer p11 showing virtual variable A and pointer p21 showing virtual variable B. Thus, to analyze the nesting process of calculation formula in Step 402 means to analyze the relationships among the pointers in the formula table of FIG. 5.

Next, a process for sorting the processing sequence of calculation formulas is carried out (Step 403). In this sorting process, the processing sequence is sorted in view of the ease of calculation such that the calculation processes for variables used in later calculations will be completed earlier.

Next, an optimization routine for the calculation process is created on the basis of the result of sorting (Step 404). In the above, optimization means, where a same operation such as A+B−C appears in every formula, to register this as a different variable and to use it in every formula so as to reduce the processing time. Where there are two formulas X=A+B−C+D−E and Y=G−H+A+B−C+F, if the common operational formula A+B−C is set equal to a new variable Z, these two formulas can be written as X=Z+D−E and Y=G−H+Z+F to reduce their processing times.

Returning to FIG. 3, the PC 2 reads out collected data from the data collecting unit (SPU) 14 of the PLC 1 (Step 302). This may be done by the PC 2 spontaneously requesting the data collecting unit 14 of the PLC 1 to transmit collected data and causing the data collecting unit 14 to respond, by the data collecting unit 14 of the PLC 1 spontaneously transmitting collected data to the PC 2 without any request from the PC 2, or by the PC 2 and the data collecting unit 14 of the PLC 1 carrying out data communications periodically. Collected data may be read out in the CSV file format or by recording them temporarily in a database.

Next, the value of each virtual variable is created by substituting the values of data of variables read out by the PC 2 into the formulas (Step 303). This is to say that the data corresponding to the variables read out from the side of the PLC 1 are substituted into the formulas defining the virtual variables such that the virtual variables that did not exist on the side of the PLC are created as if they exited.

Next, the contents of the virtual variables thus obtained by calculations are stored in an inner table within the memory of the PC 2 (Step 304). Not only the values of these newly created virtual variables but also the variables of all sorts (inclusive of bit variables and analog variables) that had been read out from the PLC 1 are stored in this inner table.

Thereafter, pulse array waveforms corresponding to the bit variables are displayed in a plurality of lines on the screen of the image display device of the PC 2 on the basis of the contents of the inner table and the analog waveforms corresponding to the analog variables are displayed superposingly in their own colors (Step 305).

Figure 9:
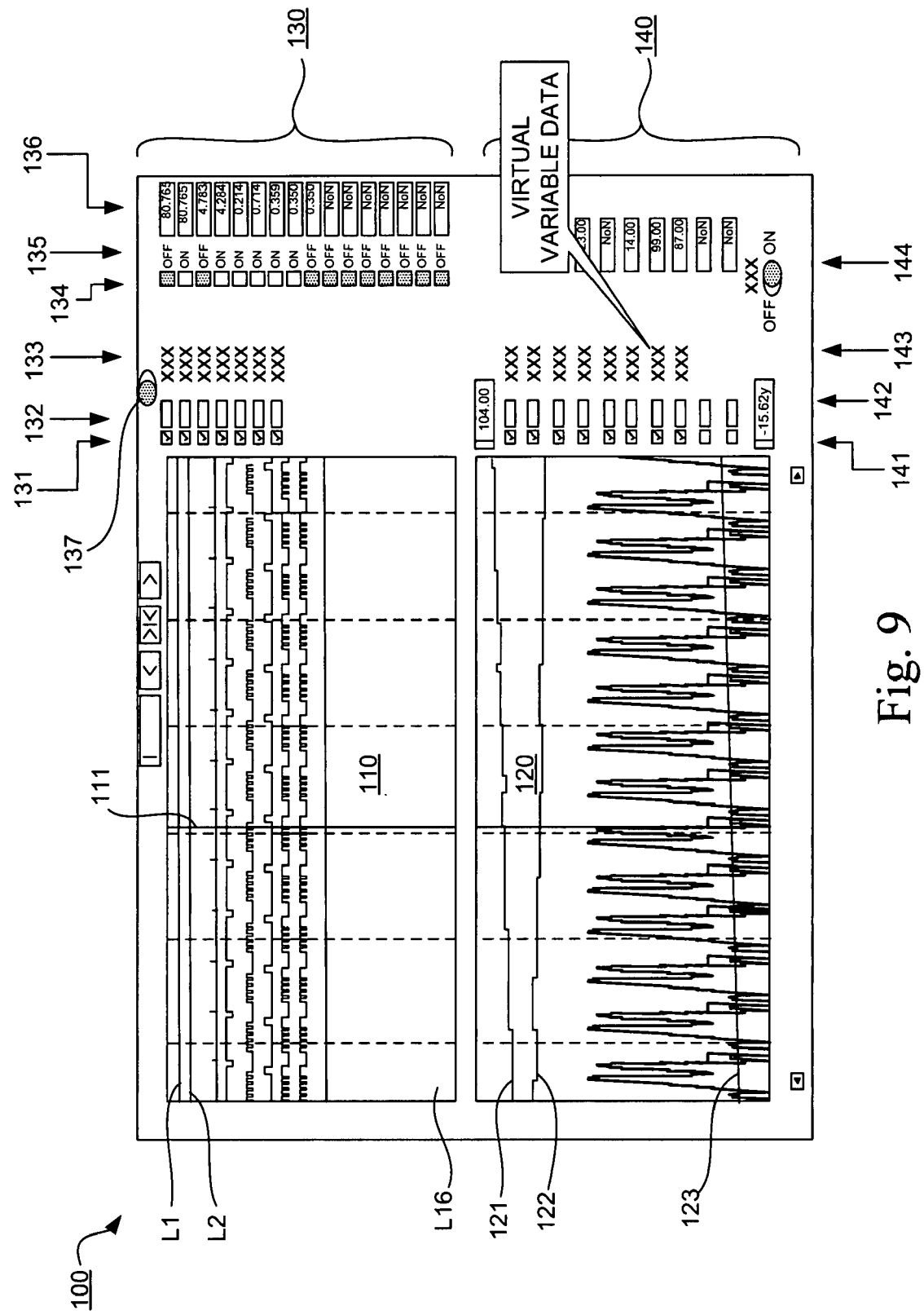
FIG. 9 is an image of the whole of a monitoring screen.

FIG. 9 shows the image of the whole monitoring screen at this moment. As shown, the whole of the monitoring screen 100 includes a bit variable waveform display area 110, an analog variable waveform display area 120, a bit variable data display area 130 and an analog variable data display area 140.

Display lines corresponding to L1-L16 are set in the bit variable waveforms display area 110, each display line serving to display a pulse array waveform for a data line corresponding to each of 16 bit variables. The horizontal axis is the time axis, the leftward direction indicating the past and the rightward direction indicating the future. The vertical axis is for showing the changes in the signal, a change from the off-condition to the on-condition being indicated by a rise in the waveform and a change from the on-condition to the off-condition being indicated by a drop in the waveform.

Analog variable waveforms corresponding individually to a specified number of analog variables are drawn in the analog variable waveform display area 120 each as a line in a different color. As in the case of the bit variable waveform display area 110, the horizontal axis is the time axis, the leftward direction indicating the past and the rightward direction indicating the future, and the vertical axis is for showing the changes in the signal, the upward direction indicating an increase in the numerical value.

The bit variable data display area 130 includes a check box array 131 for setting each display line to be active or non-active, a color box array 132 for showing the variable color corresponding to each display line, an address/comment display array 133 for displaying selectively an address or a comment corresponding to each variable, an on/off color box array 134 for showing the on-off condition at the point in time indicated by the cursor line 111 on each of the display lines L1-L16 in two colors, an ON/OFF character array 135 for showing an on-off condition by either ON or OFF, and an ON/OFF time array 136 for displaying an on-time or an off-time of an on-pulse or an off-pulse indicated by the cursor line 111.

The analog variable data display area 140 similarly includes a check box array 141 for setting the display of each analog variable to be active or non-active, a color box array 142 for showing the line color of each variable, a comment array 143 for displaying a comment on each variable, and a numerical value box array 144 for showing the numerical value of each variable at the point in time indicated by the cursor line 111.

Corresponding in particular to the present invention, virtual variables corresponding to the number of OK objects and the ratio of OK objects are displayed on the comment array, and waveform 121 corresponding to the number of produced objects, waveform 122 corresponding to the number of OK objects and waveform 123 corresponding to the number of defective objects are correspondingly shown in the analog variable waveform display area 120. The number of OK objects indicated by waveform 122 is what is obtained by the PC 2 as "Number of produced objects"–"Number of defective objects". From these waveforms, the changes in the relationship between the numbers of produced objects, OK objects and defective objects can be easily observed. The ratio of OK objects as virtual variable is the value obtained by the formula ("Number of produced objects"–"Number of defective objects")/"Number of produced objects". When this is displayed in the analog variable waveform display area 120, it is preferable to use the vertical axis as representing the ratio, the bottom point as representing 0% and the top point as representing 100%. In the example of FIG. 9, this appears nearly as overlapping with waveform 122.

These virtual variable data are created independently on the side of the PC 2. They do not exist in the memory on the side of the PLC 1 and are not collected by the data collecting unit 14. In other words, this invention makes it possible to introduce optimum virtual variables for the maintenance of production apparatus and the analysis of the cause of a failure by setting various virtual variables and observing their changes with time on a monitor screen since virtual variable data can be handled as if new variables have been set on the side of the PLC 1 by using a ladder diagram language.

Next, a PLC monitor system according to a second embodiment of this invention is explained. The second embodiment is characterized wherein the calculations of virtual variables are carried out by the data collecting unit 14, not by the monitor device PC 2. Thus, the hardware structure of this monitor system is as shown in FIG. 1, and the functions of the PLCs 1 and 5 are as described above. The difference is wherein the series of functions for obtaining virtual variables is possessed not by the PC 2, but by the data collecting unit 14.

As in the case of the first embodiment of the invention described above, the data collecting unit 14 serves to read out all or specified variable data from the memory of the CPU unit 11 of the PLC 1 through the bus and to store them in the memory within the data collecting unit 14. The data collecting unit 14 is also adapted to communicate with the PC 2 such that the collected data are read out by the PC 2. Based on the data thus obtained, the PC 2 serves to display as shown in FIG. 9 the time series of changes at pulse array waveforms or analog waveforms in a plurality of lines corresponding to each of the variable data. Thus, the user can visually monitor the I/O data handled by the PLC 1 and analog data of various kinds through the screen of the image display device.

Figure 10:
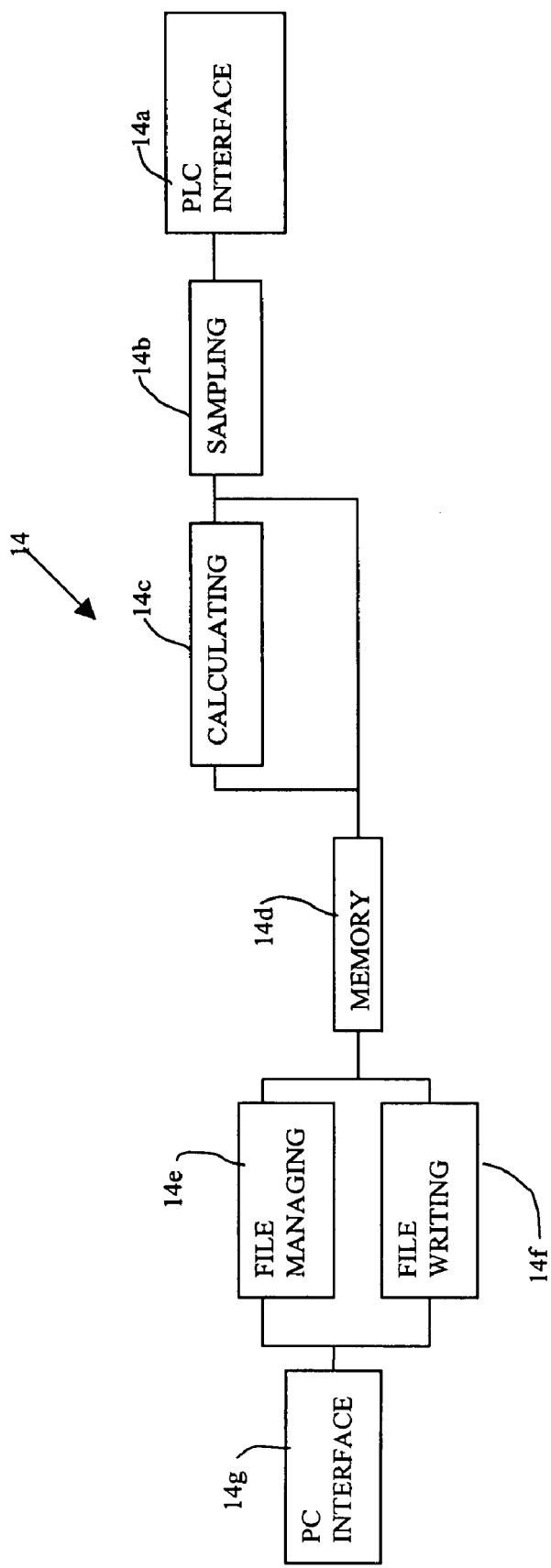
FIG. 10 is a structural diagram of the data collecting unit according to the second embodiment of this invention.

FIG. 10 shows the functional structure of this data collecting unit 14. As shown, this data collecting unit 14 is comprised of a PLC interface 14a, a sampling part 14b, a calculating part 14c, a memory 14d, a file managing part 14e, a file writing part 14f and a PC interface 14g.

The PLC interface 14a is for making a connection to the side of the PLC, having the function of being connected to the back plane bus of the PLC and carrying out data communications with the CPU unit 11 and other units. The PC interface 14g is for connecting to the side of the PC 2, being connected to the communication line 9a as shown in FIG. 1 and having the function of carrying out data communications with the PC 2.

The sampling part 14b has the function of periodically and automatically sampling already mapped data from the I/O memory and the data memory within the CPU unit 11 of the PLC 1 by accessing it through the PLC interface 14a. Of the data thus sampled, those related to variables (real variables) on the side of the PLC are directly transmitted to the memory 14d. As for the data related to virtual variables, they are obtained by the calculating part 14c substituting real variables to carry out a calculation process according to a preliminarily specified formula as will be described below and the results of such calculation process are transmitted to the memory 14d.

Data corresponding to the real and virtual variables stored in the memory 14d are transmitted through the PC interface 14g to the PC 2 by the operations of the file managing part 14e and the file writing part 14f. Thus, the data sampled by the sampling part 14b of this data collecting unit are directly stored in the memory 14d as data on real variables. Those real variable data that are used for obtaining virtual variables are also stored in the memory 14d like the real variables that are only to be collected and are read out of the memory 14d by the calculating part 14c when they are necessary for obtaining a virtual variable. The real variables which are only for being used for obtaining virtual variables may be temporarily stored in an inner buffer of the calculating part 14c, instead of being stored in a memory, to be directly used when a specified calculation is carried out. Virtual variables obtained as a result of a calculation process are written into the memory 14d.

Thereafter, the data corresponding to the real and virtual variables stored in the memory 14d are transmitted through the PC interface 14g to the PC 2 as if they were all real variables by the functions of the file managing part 14e and the file writing part 14f.

Figure 11:
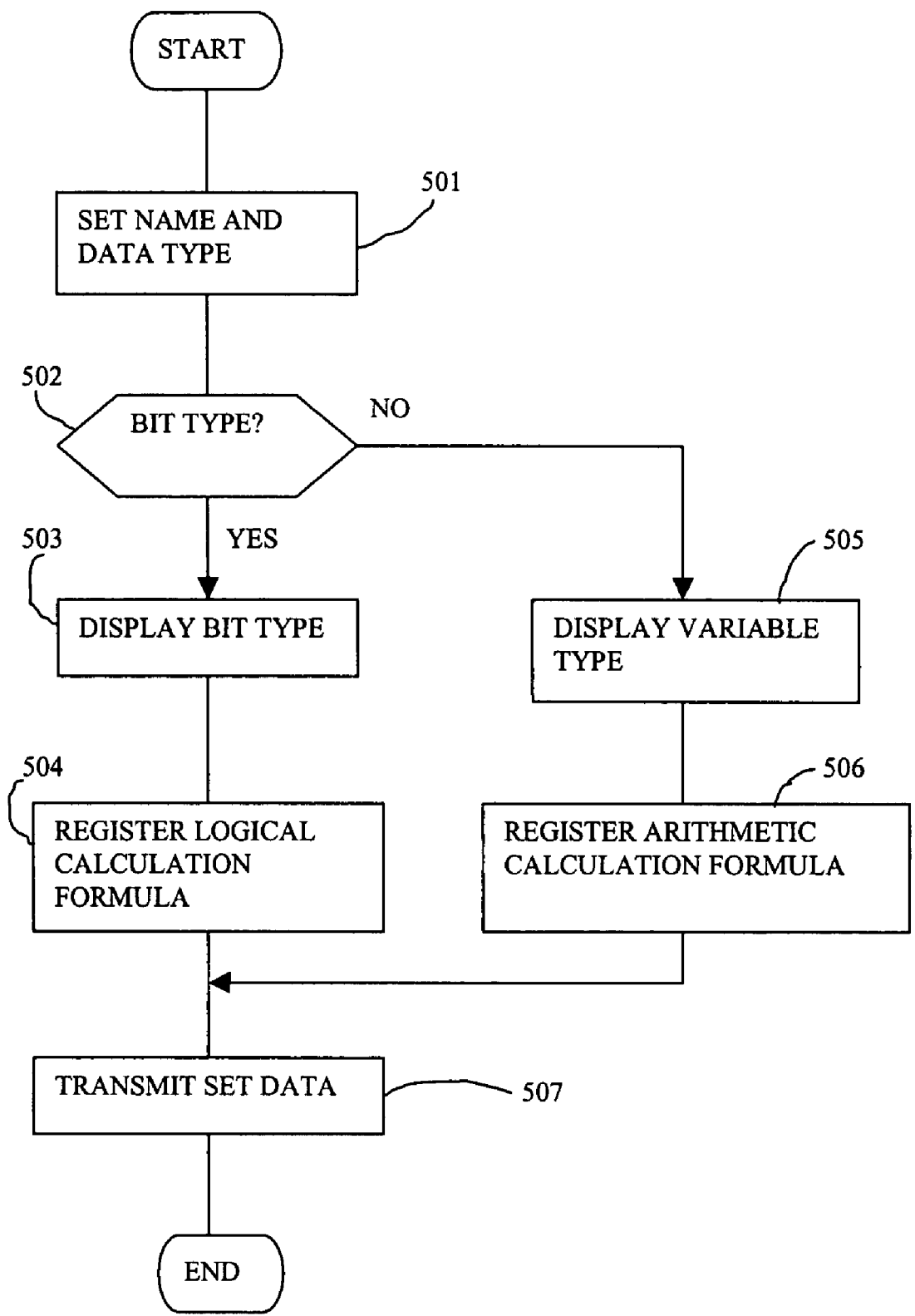
FIG. 11 is a flowchart of the virtual variable setting process according to the second embodiment of this invention.

FIG. 11 shows a flowchart of the virtual variable setting registration process carried out on the side of the PC (monitor device) 2. Calculation formulas related to virtual variables are programmed by this series of processes and these calculation formulas are transmitted to the data collecting unit and stored in its memory 14d. The image of the virtual variable setting screen is as shown in FIG. 6.

As shown in FIG. 11, the setting process for virtual variables is started by setting the name and the data type of a desired virtual variable (Step 501). This process is carried out according to the virtual variable setting screen as shown in FIG. 6. Since this step is similar to Step 201 explained above with reference to FIG. 2, its repetitive description will be omitted. Steps 502-506 that follow are also similar to Steps 202-206, respectively and the corresponding screen image is also similar to FIG. 7 and hence will not be repetitively explained.

As the virtual variable setting process on the side of the monitor device 2 is completed, the setting data inclusive of the calculation formulas for prescribing each of the virtual variables thus obtained are transmitted to the data collecting unit 14 on the side of the PLC (Step 507). It is convenient to arrange the setting data in a file format. The data collecting unit 14 receives such setting files through the PC interface 14g and stores them in the memory 14d by the function of the file writing part 14f. After the data collecting unit 14 has stored the setting files, the calculation formulas registered in the memory within the PC 2 and other setting data may be erased. This series of setting steps may be carried out by means of another setting tool (not shown) instead of the PC 2.

The virtual variable list screen thus set is similar to the image shown in FIG. 8. As the PC 2 is set in a specified display mode, such a virtual variable list screen can be displayed on the side of the PC 2. If calculation formulas are left registered in the memory within the PC 2, data on these formula may be read out of the memory within the PC 2 to have them displayed again. If data on the formulas are erased from the memory within the PC 2, these data on the formula may be read out from the data collecting unit for a display. The operator can recognize the name, data type and calculation formula of any virtual variable by observing this list screen. It may also be so arranged to selectively set any virtual variable to be displayed on the display device on the basis of this list screen. This series of display operations, too, may be carried out by means of another setting tool (not shown) instead of the PC 2.

FIG. 7 shows an example of collection setting screen. A collection setting list can be displayed on the screen of the image display device of the PC 2, and not only the real variables selected as objects of data collection but also any desired virtual variables may be included. This series of display operations, too, may be carried out by mean of a different display tool (not shown) instead of the PC 2. In the example of FIG. 7, as in the case of the first embodiment of the invention described above, "Number of OK objects" and "Ratio of OK objects" correspond to virtual variables.

Since the virtual variables thus selected and set are obtained by the calculation of the data collecting unit, the virtual variables shown by these calculation formulas can be handled as if new variables had been set by using a ladder diagram language in a monitor process on the side of the PLC.

Figure 12:
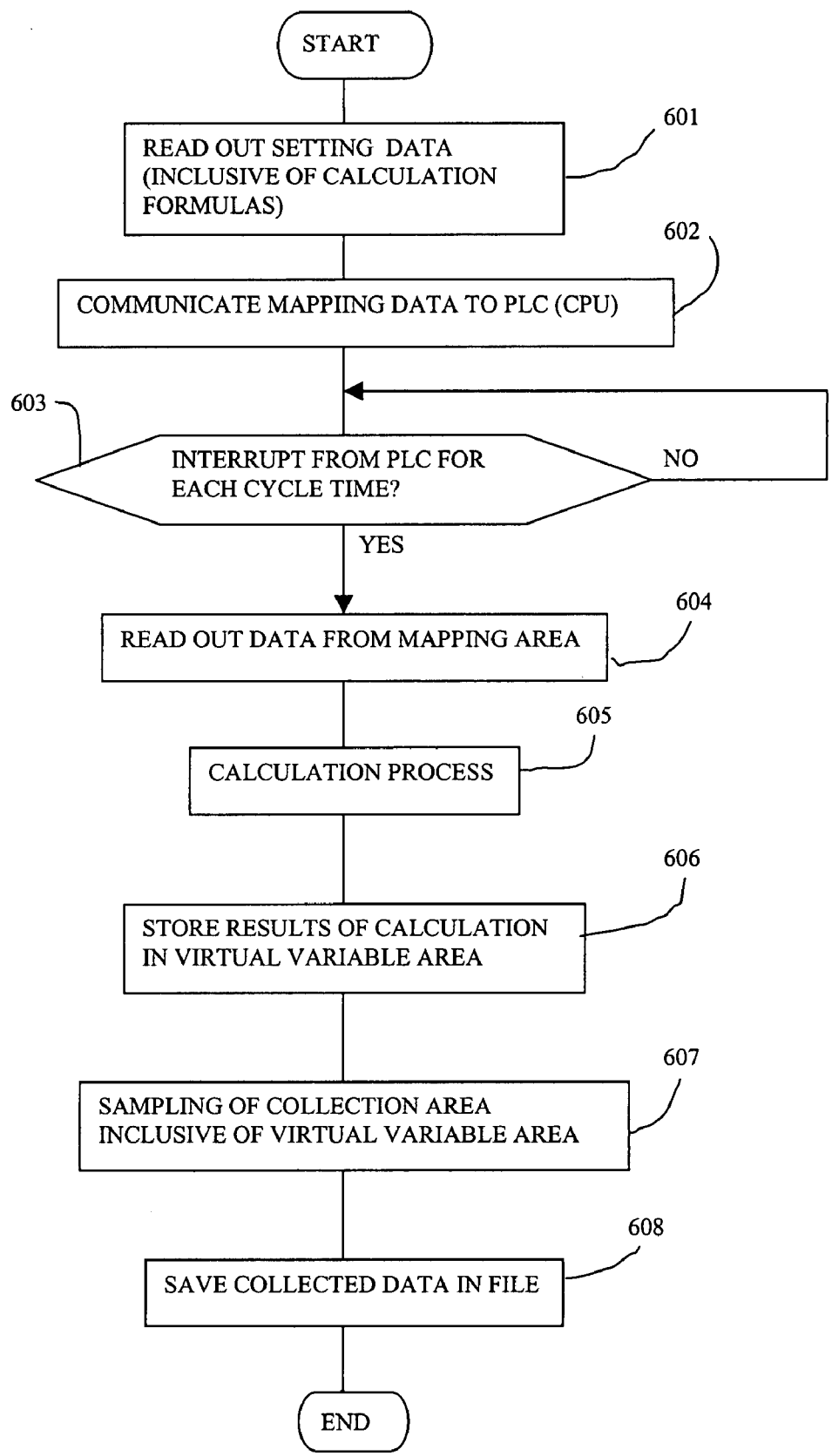
FIG. 12 is a flowchart showing the whole of the collection process by the data collecting unit according to the second embodiment of this invention.
Figure 13:
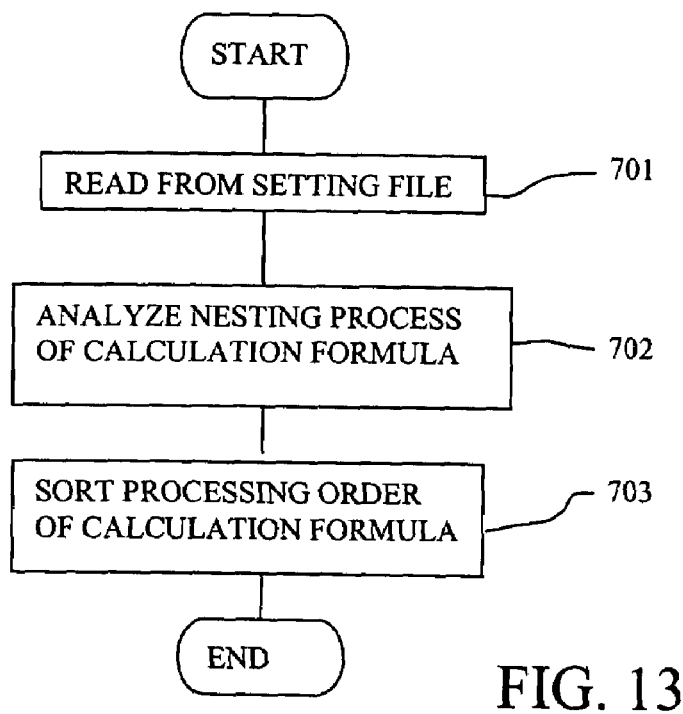
FIG. 13 is a detailed flowchart of the set data readout process according to the second embodiment of this invention.

FIG. 12 is a flowchart showing the whole of the collection process carried out on the side of the data collecting unit 14. In this process, setting data (inclusive of calculation formulas) are first read out of the memory 14*d* through the file managing part 14*e* (Step 601). A detailed flowchart of this setting data readout process is shown in FIG. 13. As shown, setting files are first read out in this process (Step 701). Next, calculation formulas for virtual variables are obtained from the data contained in the setting files which have been read out and the nesting processes regarding the calculation formulas are analyzed (Step 702). The structural diagrams of calculation formulas stored in the memory 14*d* are similar to those shown in FIG. 5. To analyze the nesting processes in Step 702 means to analyze the relationships among the pointers shown in the formula memory table shown in FIG. 5.

Next, the process of sorting the order for executing the formulas is carried out (Step 703). This is done by considering the ease of executing the nesting process. This is also similar to Step 403 described above with reference to FIG. 4.

Next, an optimization routine for the calculation process may be created on the basis of the result of the sorting process, as done in Step 404 described above with reference to FIG. 4. There are many processes that are common in FIGS. 4 and 13, but the processes in FIG. 4 are carried out by the PC 2 while the processes in FIG. 13 are carried out by the data collecting unit 14.

With reference back to FIG. 12, the mapping data for specifying data to be read out are communicated next to the CPU unit of the PLC (Step 602). This is done by indicating the stored addresses of the object data to be collected and making a request.

Thereafter, the data collecting unit (SPU) 14 waits for the arrival of an interrupt from the PLC (or its CPU) for each cycle time (Step 603). If there is an interrupt (YES in Step 603), the data collecting unit 14 reads out the corresponding data from the mapping area of the PLC through the sampling part 14*b* and the PLC interface 14*a* (Step 604), and the data thus read out are stored in the memory 14*d*. Alternatively to aforementioned Step 603, the data collecting unit 14 may generate self-interrupt timing for every sampling period for collecting data and read out the data from the CPU unit by its own interrupt. Next, the calculating part 14*c* carries out specified calculation processes based on the calculation formulas preliminarily set for each of the virtual variables such as substituting the values of the collected data into the formulas and obtains the values of the virtual variables (Step 605).

The results of the calculations thus obtained are stored at the specified virtual variable area in the memory 14*d* of the data collecting unit 14 (Step 606). Thereafter, a collection area inclusive of the virtual variable area is sampled at a specified frequency (Step 607) and the collected data are saved in a specified file together with the calculation results (Step 608). The saving processes of Steps 607 and 608 may be carried out at each sampling as shown in FIG. 12 or once over a plurality of sampling periods.

The collected data (data on real variables) thus saved in a file and the calculation results (data on virtual variables) are transmitted to the side of the PC 2 through communications between the PC 2 and the data collecting unit 14 at a suitable timing, to be stored in the inner table within the memory of the PC 2 and displayed on the screen of the display device, as explained above.

Figure 14:
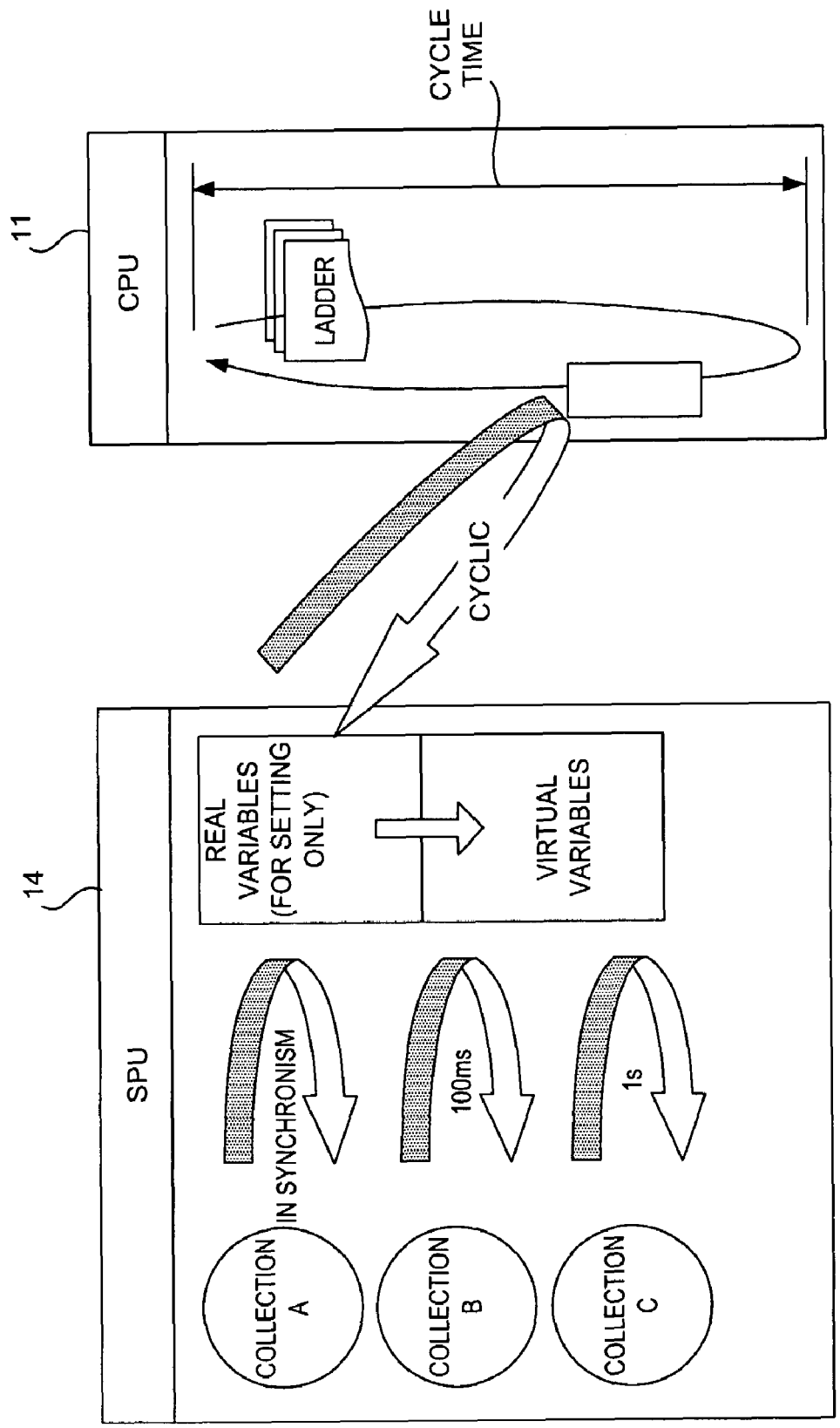
FIG. 14 is a conceptual diagram showing the relationship between the memory mapping and the collection format according to the second embodiment of this invention.

FIG. 14 is a conceptual diagram showing the relationship between the memory mapping and the collection format. As shown, the CPU 11 of the PLC 1 carries out the I/O refresh process, the user program execution process and the peripheral service process cyclically with a specified cycle time, and the data collecting unit 14 collects from the CPU unit 11 the variable data specified by the mapping data (bit variable data which are on-off data and analog variable data which are number data) for each cycle time. In synchronism with the cycle time, the data collecting unit 14 calculates the values of the virtual variables based on the values of the real variables according to preliminarily set formulas and writes them in the virtual variable area within the memory of the data collecting unit 14.

Apart from the above, there are provided three collecting processes (Collection A, Collection B and Collection C) having individual sampling frequencies (longer than the sampling frequency in synchronism with the cycle time of the CPU unit) by which the real variables in the real variable area on the side of the CPU unit are collected independently and stored in the real variable area of the data collecting unit 14. Virtual variables are obtained as the real variables are substituted into the calculation formulas, and they are stored in the virtual variable area of the data collecting unit 14. This is done because the collected data are a mixture of those to be monitored with a short sampling frequency in synchronism with the cycle time of the CPU unit, those to be monitored with a longer sampling time (such as 100 ms) than the cycle time of the CPU unit, and those to be monitored with a still longer sampling time (such as 1 s).

The data on real variables thus collected and the virtual variables obtained by formulas are kept in a file and transmitted to the side of the PC 2, whenever necessary. Thereafter, waveform diagrams can be displayed over a plurality of lines on the screen of an image display device on the side of the PC 2, based on the data arrays corresponding to the real and virtual variables. Such a screen image is as shown in FIG. 9 and hence will not be repetitively explained. In summary, appropriate monitoring process becomes possible according to suitable monitoring items for each target apparatus to be controlled.

Figure 15:
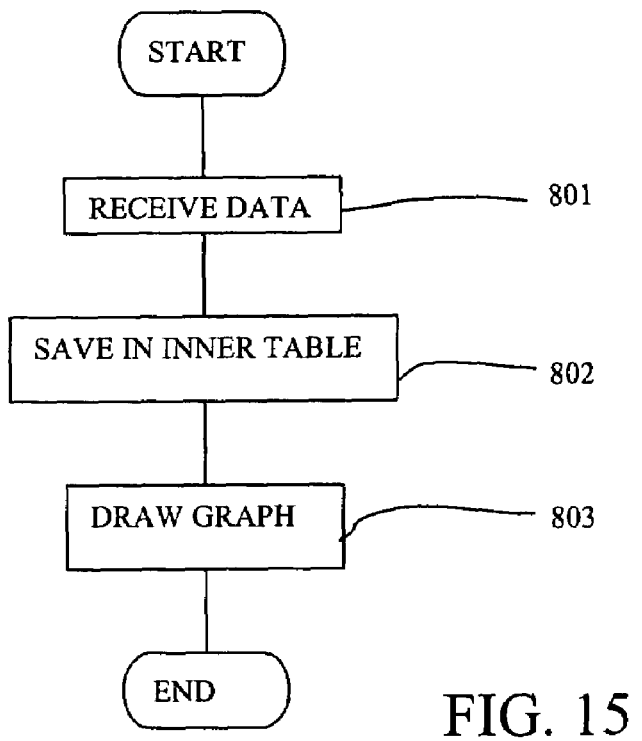
FIG. 15 is a general flowchart of the whole of the monitoring process according to the second embodiment of this invention.

FIG. 15 is a general flowchart of the whole of the monitoring process carried out on the side of the monitor device (PC) 2. As shown, a process for reading out corresponding data (inclusive of real and virtual variables) from the memory 14d of the data collecting unit 14 is carried out by communicating with the data collecting unit 14 (Step 801). This may be done by the PC 2 making a request for the transmission of data to the data collecting unit 14 and receiving its response or by the data collecting unit 14 independently transmitting the data which are received by the PC 2.

Next, the data read out of the data collecting unit 14 of the PLC 1 are stored in the inner table within the memory of the PC 2 (Step 802), and the data thus stored in the inner table (inclusive of real and virtual variables) are displayed on the screen 100 (as shown in FIG. 6) of the image display device of the PC 2 by the operations of the processor within the PC 2. The image on the monitor screen as a whole at this moment is as shown in FIG. 9.

Corresponding in particular to the present invention, virtual variables corresponding to the number of OK objects and the ration of OK objects are displayed on the comment array, and waveform 121 corresponding to the number of production, waveform 122 corresponding to the number of OK objects and waveform 123 corresponding to the number of defective objects are correspondingly shown in the analog variable waveform display area 120. The number of OK objects indicated by waveform 122 and the ratio of OK objects as virtual variable are values to be obtained as explained above.

These virtual variable data are created independently on the side of the data collecting unit 14. They do not exist in the memory on the side of the PLC 1 and are not obtained on the side of the PC 2 by carrying out calculations. In other words, this invention makes it possible to handle virtual variable data as if new variables have been set on the side of the PLC 1 by using a ladder diagram language, making it possible to introduce optimum virtual variables for the maintenance of production apparatus and the analysis of a cause of a failure by setting various virtual variables and observing their changes with time on a monitor screen.

According to a third embodiment of the invention, the calculation processes for obtaining virtual variables are carried out both on the side of the data collecting unit and on the side of the monitoring device. When virtual variables are set and registered according to this embodiment of the invention, there is an additional step of selecting whether a device for carrying out the process of obtaining each virtual variable is provided on the side of the data collecting unit or on the side of the monitoring device. If the side of the data collecting unit is selected, the calculation formulas for obtaining the virtual variables are stored on the side of the data collecting unit. If the side of the monitoring device is selected, they are stored on the side of the monitoring device. In summary, it is structured such that a device other than the CPU unit 11 of the PLC 1 will set and register the calculation formulas for obtaining the virtual variables, collect the real variables necessary for obtaining the virtual variables and display the obtained virtual variables on the display screen. Such a structure may be realized by means of a single device or a plurality of devices.

According to a fourth embodiment of the invention, the data collecting unit 14 according to the second embodiment of the invention is not of the so-called unit type that is integrally connected to the PLC 1 but is connected to the PLC 1 through a bus communication line and also to the PC 2 through another communication line, serving as a relay placed in between. The data collecting unit thus structured is functionally the same as the data collecting unit according to the second embodiment but is not structurally connected to the back plane of the PLC 1.

According to this invention, since corresponding waveforms are displayed on the screen of an image display device on the side of the monitoring device based on virtual variable arrays obtained by calculation formulas preliminarily set on the side of the data collecting unit or on the side of the monitoring device and each of real variable data arrays stored on the side of the monitoring device, new variables can be defined without using a dedicated language such as a ladder diagram language on the side of the PLC to add or change the memory assignment and hence the data to be monitored can be expanded without causing any delay in the cycle time due to the addition of a user program.

What is claimed is:

1. A monitor system comprising:
    a programmable controller for executing a user program to carry out a control;
    a data collecting unit connected to said programmable controller for collecting variable data of said programmable controller; and
    a monitor device connected to said data collecting unit through a communication line;
    said data collecting means including collecting means for collecting real variable data in the calculation formula stored in said memory means and any other real variables from said programmable controller;
    said monitor device including:
        memory means for storing a preliminarily defined virtual variable apart from said user program of said programmable controller and from said variable data of said programmable controller and a calculation formula using one or more real variables for obtaining said virtual variable;
        calculating means for carrying out a calculation according to the calculation formula stored in said memory means based on the real variable data collected by said collecting means; and
        displaying means for displaying correspondence of the real variables collected by said collecting means and the result of the calculation by said calculating means as waveforms on a display device;
    wherein said collecting means includes means for collecting data on the real variables from a memory of said programmable controller based on mapping data in synchronism with the cycle time of said programmable controller and means for transmitting the collected data on the real variables to said monitor device;
    wherein said calculating means includes means for obtaining the data on the real variables from said collecting means and means for generating a data array of virtual variables by substituting the obtained data into the calculation formula stored in said memory means; and
    wherein said displaying means displays the obtained data on the real variables from said collecting means as waveforms on said display device.

2. A monitor device of the monitor system of claim 1 further comprising setting-registering means for setting and registering the virtual variables and the calculation formula stored in said memory means through a setting screen;
    wherein said calculating means includes means for obtaining the data on the real variables collected by said data collecting unit from said programmable controller and means for generating a data array of virtual variables by substituting the obtained data on the real variable into the calculation formula stored in said memory means; and wherein said displaying means displays time series of changes in data on real and imaginary variables from the data of the real variables collected by said data collection unit from said programmable controller and the virtual variables obtained by said calculating means as waveforms on said display device.

3. The monitor device of claim 2 wherein said setting-registering means includes:

virtual variable setting screen displaying means for displaying a virtual variable setting screen, said virtual variable setting screen displaying means having:

an input data display area having display areas for names of virtual variables, a display area for data types of virtual variables and a display area for calculation formulas for defining virtual variables;

a variable list display area for displaying as a menu a list of variables that are selectable for setting virtual variables; and an operating key display area which includes a key display area for displaying number keys, logical value keys, arithmetic operation keys and logical operation keys that are used for defining virtual variables and a confirmation key for confirming virtual variables;

means for creating calculation formulas for virtual variables corresponding to user's operations including operations on said variable list display area for selecting variables and operations on said number keys, said logical value keys, said arithmetic operation keys, said logical operation keys and said confirmation key; and means for registering the created calculation formulas.

4. A data collecting unit of the monitor system of claim 1 wherein said data collecting unit comprises said memory means, said collecting means and said calculating means;

wherein said memory means includes means for creating mapping data on real variables in a memory of said programmable controller based on real variables in the calculation formula stored in said memory means and the other real variable of said collecting means;

wherein said collecting means includes means for collecting data on the real variables from a memory of said programmable controller based on said mapping data in synchronism with the cycle time of said programmable controller; and wherein said calculating means includes means for generating a data array of virtual variables by substituting the data obtained by said collecting means into the calculation formula stored in said memory means and means for transmitting the generated data array of the virtual variables to said monitor device.

5. A monitor system comprising:

a programmable controller for executing a user program to carry out a control;

a data collecting unit connected to said programmable controller for collecting variable data of said programmable controller; and a monitor device connected to said data collecting unit through a communication line;

said data collecting unit including:

memory means for storing a preliminarily defined virtual variable apart from said user program of said programmable controller and from said variable data of said programmable controller and a calculation formula using one or more real variables for obtaining said virtual variable;

collecting means for collecting real variable data in the calculation formula stored in said memory means and any other real variables from said programmable controller; and calculating means for carrying out a calculation according to the calculation formula stored in said memory means based on the real variable data collected by said collecting means;

said monitor device including displaying means for displaying correspondence of the real variables collected by said collecting means and the result of the calculation by said calculating means as waveforms on a display device;

wherein said memory means includes means for creating mapping data on real variables in a memory of said programmable controller based on real variables in the calculation formula stored in said memory means and the other real variable of said collecting means;

wherein said collecting means includes means for collecting data on the real variables from a memory of said programmable controller based on said mapping data in synchronism with the cycle time of said programmable controller; and wherein said calculating means includes means for generating a data array of virtual variables by substituting the data obtained by said collecting means into the calculation formula stored in said memory means and means for transmitting the generated data array of the virtual variables to said monitor device.

* * * * *